(12) United States Patent
Shuto et al.

(10) Patent No.: US 6,731,655 B1
(45) Date of Patent: May 4, 2004

(54) CURRENT DIFFERENTIAL RELAY DEVICE

(75) Inventors: Itsuo Shuto, Hachioji (JP); Hajime Kurihara, Tokorozawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 737 days.

(21) Appl. No.: 09/588,200

(22) Filed: Jun. 6, 2000

(30) Foreign Application Priority Data

Jun. 7, 1999 (JP) .......................................... 11-159141

(51) Int. Cl.⁷ .............................................. H04L 12/10
(52) U.S. Cl. ...................................... 370/505; 370/503
(58) Field of Search ................................. 370/470, 471, 370/503, 505, 506, 514

(56) References Cited

U.S. PATENT DOCUMENTS 5,953,378 A * 9/1999 Hotani et al. ............... 375/341

* cited by examiner

*Primary Examiner*—Kenneth Vanderpuye
(74) *Attorney, Agent, or Firm*—Finnegan, Henderson, Farabow, Garrett & Dunner, L.L.P.

(57) ABSTRACT

In transmitting signals to an opposing terminal by introducing a system current from a terminal of this side, a dummy bit interpolator (105) is provided for inserting dummy bits among the fixed frame lengths of the transmission signals to adjust the length of the transmission data by using dummy bits in order to maintain synchronism in the sampling timings even when there does not hold a multiple relationship between the sampling frequency and the rate of transmission.

6 Claims, 8 Drawing Sheets

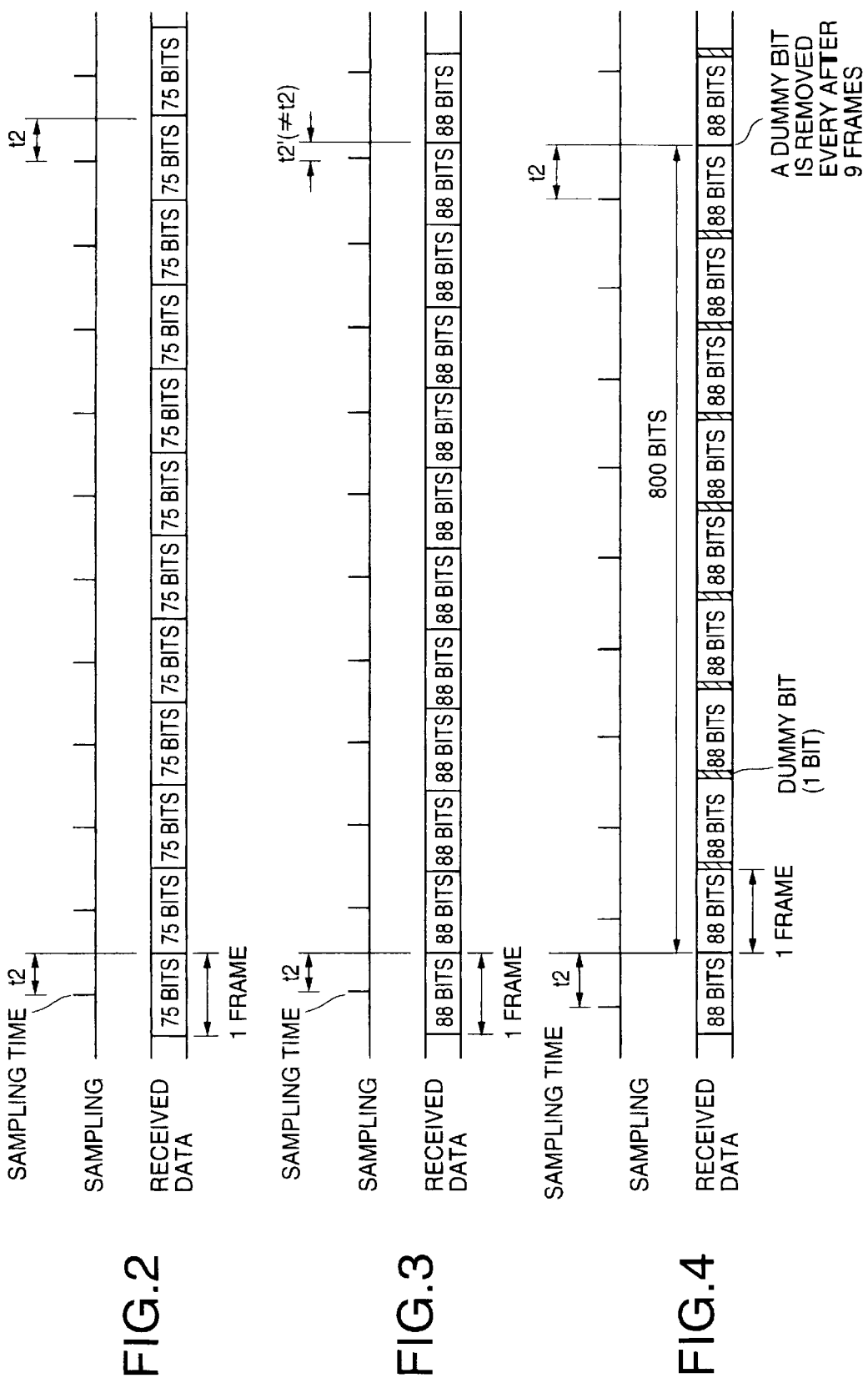

CURRENT DIFFERENTIAL RELAY DEVICE

BACKGROUND OF THE INVENTION

1. Field of the Invention

The present invention relates to a protection relay system for protecting a power system and, particularly, to a current differential relay device for protecting a power transmission line based on the principle of current differential.

2. Prior Art

FIG. 10 illustrates a constitution example in which a current differential relay device is applied for protecting a power transmission line constituting a power system. A current differential relay system shown in FIG. 10 includes a pair of current differential relay devices 2 and 3 provided at terminals 1A and 1B of the power transmission line 1. Current values at the terminals 1A and 1B of the power transmission line 1 are detected by current detectors 4 and 5, and the detected current values are sent to the current differential relay devices 2 and 3 at the terminals, and are sampled and are converted into digital values. Here, the sampled current values are used by the current differential relay devices 2 and 3 at the terminals, and are further sent to the current differential relay devices 3 and 2 at the other terminals relative to each other through signal transmission lines 12 and 13 provided between the current differential relay devices 2 and 3. Thus, the current differential relay device 2(3) executes the operation for current differential protection based on a current value at its own terminal 1A(1B) and a current value at the other terminal 1B(1A), and generates an output signal based on the result of operation. An accident that happens to occur on the power transmission line is detected based on the current differential that abnormally increase at both terminals, and at least one breaker in the power transmission line 1 is tripped to remove accident.

The current values used by the current differential relay devices 2 and 3 for executing the operation for current differential protection must be those that are sampled at the same time by the two current differential relay devices 2 and 3. For this purpose, it is essential that the current values used by the two current differential relay devices 2 and 3 for operating the current differential protection must be in synchronism with each other. It therefore becomes necessary to control the sampling synchronization in order to eliminate an error in synchronizing the sampling between the current differential relay devices 2 and 3.

A conventional operation for synchronizing the samplings will be described with reference to FIG. 11. In FIG. 11, the current differential relay devices 2 and 3 send digital transmission signals TX2 and TX3 to the other terminals in synchronism with a sampling time TS2 or TS3 at its own terminal. If the transmission of transmission signals TX2 and TX3 from one terminal to the other terminal involves a delay component due to the transmission lines or a transmission delay time td due to delay in the relay devices, then, the transmission signals TX2 and TX3 are received at its own terminal after the passage of the time td from a reference time at which the transmission signal was transmitted from the other end. Here, the times until the transmission signals are received as measured using the sampling time TS2 or TS3 at its own terminal as a reference are regarded to be reception times t2 and t3. It is desired that the two current differential relay devices 2 and 3 are in synchronism with each other and perform the sampling operations at the same time. However, an error occurs in synchronizing the samplings between the current differential relay devices 2 and 3. FIG. 11 illustrates a case where an error $\Delta T$ exists in synchronizing the samplings between the sampling time TS2 of the current differential relay device 2 and the sampling time TS3 of the current differential relay device 3.

As will be obvious from FIG. 11, the following relations (1) and (2) hold among the reception times t2, t3, transmission delay time td and error $\Delta T$ in synchronizing the samplings. From the relations (1) and (2), the error $\Delta T$ in synchronizing the samplings can be operated according to a relation (3). One or both of the current differential relay devices 2 and 3 control the synchronization of samplings by so adjusting the oscillation frequencies of the sampling synchronization oscillators incorporated therein that the operated error $\Delta T$ becomes zero in synchronizing the samplings.

$$t2 = td + \Delta T \quad (1)$$

$$t3 = td - \Delta T \quad (2)$$

$$\Delta T = (t2 - t3)/2 \quad (3)$$

To operate the error $\Delta T$ in synchronizing the samplings, it is essential that the times t2 and t3 of receiving data from the other terminals as measured with the sampling time at its own terminal as a reference are constant at every period For this purpose, a multiple relationship must exist between the sampling frequency and the rate of transmitting the transmission data. When the multiple relationship does not exist between the sampling frequency and the rate of transmitting the transmission data, the times of receiving data from the other terminals deviate as measured with the sampling time as a reference, and the result of operating the error $\Delta T$ in the sampling period does not become constant at every period and the sampling times can no longer be brought into synchronism with each other.

For example, when the sampling frequency is 720 Hz and the rate of transmission is 54 kbps (kilobits per second), there exists a multiple relationship (54000/720=75) between the sampling frequency and the rate of transmission. Upon periodically sending a data of 75 bits per a sampling period, the times of receiving data from the other terminals become constant as measured with the sampling time as a reference, and the sampling times can be brought into synchronism with each other.

However, when the sampling frequency is 720 Hz and the rate of transmission is, for example, 64 kbps, there does not exist a multiple relationship between the sampling frequencyand the rateof transmission (64000/720=88.88 . . . ) If the data of 88 bits per a sampling period is periodically transmitted, an error corresponding to 0.88 . . . bits occur per a sampling period, and the times for receiving data from the other terminals do not become constant as measured with the sampling time as a reference. According to the prior art, therefore, it is not allowed to bring the sampling timings into synchronism between the current differential relay devices at both terminals.

SUMMARY OF THE TNVENTTON

It is an object of the present invention to provide a current differential relay device capable of stable accomplishing the synchronism of samplings by nearly constantly holding the times for receiving data from the other terminals with the sampling time as a reference even when a multiple relationship does not exist between the sampling frequency and the rate of transmission.

In order to accomplish the above object according to the current differential relay device of the present invention, the terminal currents of the power system are sampled at the same time maintaining a predetermined period, and the protection operation is executed by using the sampled current data, wherein provision is made of means for inserting dummy bits among the fixed frame lengths of transmission signals so that, even when there exists no multiple relationship between the sampling frequency and the rate of transmission, the length of transmission data is adjusted by the insertion of the dummy bits to bring the sampling times into synchronism.

There are further provided means for-accomplishing synchronism between both terminals with the fixed frame length of the transmission signal as a unit, and means for accomplishing synchronism of timings for inserting the dummy bits between both terminals, thereby to adjust the length of transmission data by inserting the dummy bits and to bring the sampling times into synchronism even when there exists no multiple relationship between the sampling frequency and the rate of transmission.

Provision is made of means for inserting dummy bits in synchronism with timings for sending a transmission data of a predetermined period to synchronize the samplings, whereby the length of transmission data is adjusted by the insertion of the dummy bits to synchronize the sampling timings even when there exists no multiple relationship between the sampling frequency and the transmission frequency.

Provision is further made of means for accomplishing the synchronism between both terminals with a fixed frame length of a transmission signal as a unit, means for picking up clocks from the transmission signals, and means for producing sampling synchronizing signals based on the clocks that are picked up, in order to adjust the length of transmission data by inserting dummy bits and to synchronize the sampling timings based on the signals that are received or the clocks that are picked up even when there exists no multiple relationship between the sampling frequency and the transmission frequency.

Provision is further made of means for accomplishing the synchronism between both terminals with a fixed frame length of a transmission signal as a unit, means for receiving clocks from a communication unit, and means for producing sampling synchronizing signals based on the clocks that are received, in order to adjust the length of transmission data by inserting dummy bits and to synchronize the sampling timings based on the clocks output from the communication unit even when there exists no multiple relationship between the sampling frequency and the transmission frequency.

Provision is further made of means for producing dummy bits in a number of n or n ±1, in order to adjust the length of transmission data by inserting dummy bits and to synchronize the sampling timings even when there exists no multiple relationship between the sampling frequency and the transmission frequency.

BRIEF DESCRTPTION OF THE DRAWINGS

FIGS. 2 to 6 are diagrams illustrating different constitutions for transmitting data for explaining the operation of the device of FIG. 1;

DETAILED DESCRTPTION OF THE PREFERRED EMBODIMENTS

Embodiment 1

Figure 1:
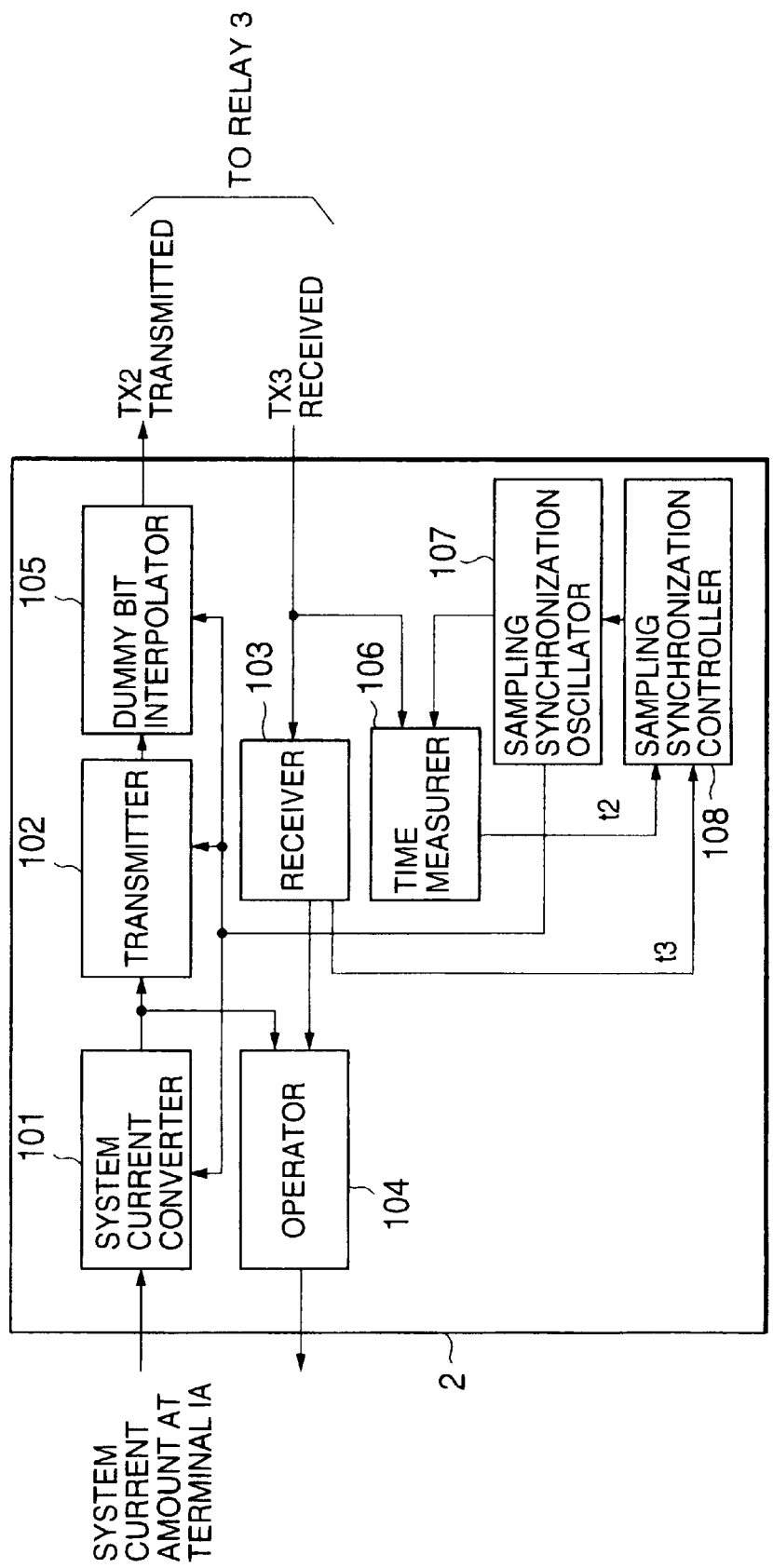
FIG. 1 is a block diagram illustrating a current differential relay device according to an embodiment of the present invention.
Figure 10:
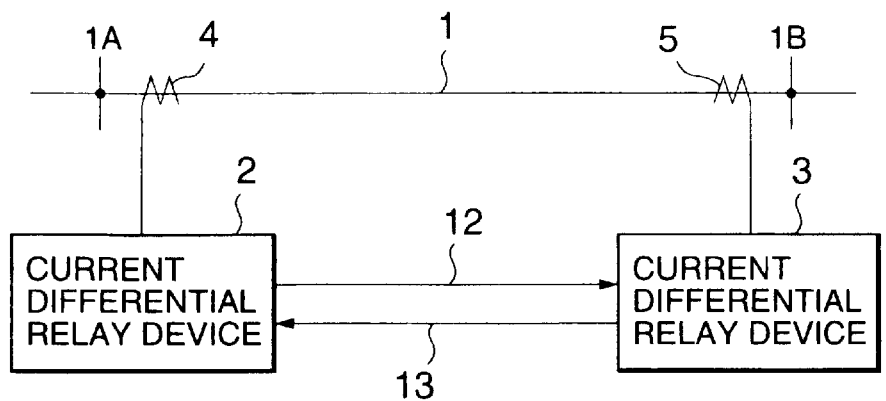
FIG. 10 is a block diagram of a current differential relay device according to a prior art.

FIG. 1 is a block diagram of a current differential relay device 2 according to an embodiment of the present invention. Here, though not diagramed, a current differential relay device 3 has an internal structure same as that of the current differential relay device 2. The current differential relay device 2 shown in FIG. 1 is provided at one terminal 1A of a power transmission line 1 and has a system current converter 101 that receives a system current amount detected by the current detector 4 (FIG. 10) and converts it into a digital current data that can be transmitted. Adigital current dataobtained from thesystem current converter 101 is input as a first current data to an operator 104 which executes the operation for current differential protection, and is sent over a transmission line to the current differential relay device 3 (not shown) provided at the other terminal 1B of the power transmission line 1 through a transmitter 102 and a dummy bit interpolator 105. The current data that is sampled and is converted into a digital form through the current differential relay device 3 at the terminal 1B, is sent to the current differential relay device 2 and is received by a receiver 103. The current data of the terminal 1B received by the receiver 103 is input as a second current value to an operator 104. The receiver 103 fetches time data t3 obtained out of the transmission signals TX3 by being measured by the current differential relay device 3, and sends it to the sampling synchronization controller 108.

The current differential relay device 2 further includes a time measurer 106 and a sampling synchronization oscillator 107. The time measurer 106 receives transmission signals TX3 from the terminal 1B and signals output from the sampling synchronization oscillator 107, and measures a time t2 for receiving the transmission signals TX3 from the terminal 1B. By using the time t2 measured by the time measurer 106 and the time t3 sent from the receiver 103, the sampling synchronization controller 108 operates an error ΔT in synchronizing the samplings according to the relation (3) and controls the oscillation frequency of the sampling synchronization oscillator 107 so that the error becomes zero. The sampling synchronization oscillator 107 sends pulse signals corresponding to the oscillation frequency to the time measurer 106, system current converter 101, transmitter 102 and dummy bit interpolator 105 at regular intervals.

Figure 11:
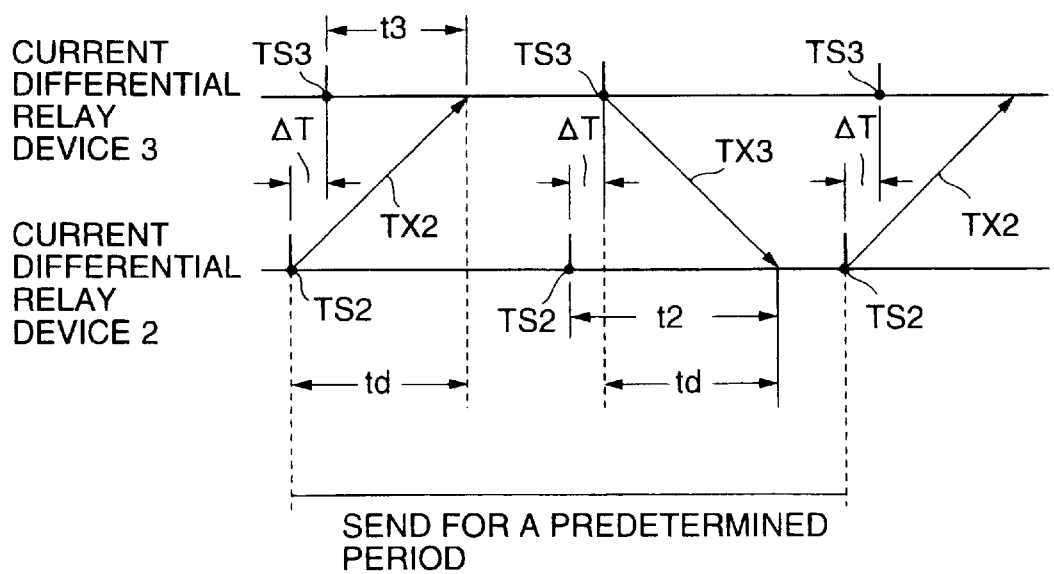
FIG. 11 is a time chart illustrating the operation of the device of FIG. 10.

In the relay device shown in FIG. 1, the time data t3 received by the receiver 103 and the time t2 measured by the time measurer 106 correspond to the times t3 and t2 shown in FIG. 11. The current differential relay device 3 at the terminal 1B, too, is constituted in the same manner as the current differential relay device 2 at the terminal 1A, and obtains the data related to times t2 and t3 as viewed from the side of the relay device 3.

Next, described below is the operation of the current differential relay device 2. The system current converter 101 samples the current value of the power transmission line 1 according to pulse signals of a predetermined period output from the sampling synchronization oscillator 107, and converts it into a digital value. The digital current value, on one hand, is converted into a transmission signal through the transmitter 102 and is transmitted, in the form of a transmission signal TX2, to the relay device 3 through the dummy bit interpolator 105. As will be described later, the dummy bit interpolator 105, as required, adds dummy bits to the current data in order to adjust the length of the transmitted data. The digital current value, on the other hand, is sent to the operator 104 which also receives, as a transmission signal TX3, a current data of the terminal 1B received by the receiver 103 from the current differential relay device 3. The operator 104 executes a predetermined operation for current differential protection based on the current data input from both terminals, and produces a trip signal in case an accident is detected. The simultaneous samplings of currents by the current differential relay devices 2 and 3, that serve as a prerequisite of operation for current differential protection, are realized according to the following procedures.

The timemeasurer 106 measures the time t2 for receiving the transmission signal TX3 from the other terminal and inputs it to the sampling synchronization controller 108. The sampling synchronization controller 108 operates an error ΔT in synchronizing the samplings according to the relation (3), and produces a sampling synchronization control signal based thereupon. The sampling synchronization control signal is input to the sampling synchronization oscillator 107 thereby to control the oscillation frequency of the sampling synchronization oscillator 107 so that the error ΔT in synchronizing the samplings becomes zero.

FIG. 2 illustrates a constitution of transmission data in which there exists a multiple relationship between the sampling frequency and the rate of transmission. In the example of FIG. 2, the sampling frequency is 720 Hz, the rate of transmission is 54 kbps, and the reception data of 54000/720=75 bits is transmitted as a frame for every sampling period. In this case, the receiving times t2 and t3 assume constant values enabling the samplings to be normally maintained in synchronism.

On the other hand, FIG. 3 illustrates a case where there is no multiple relationship between the sampling frequency and the rate of transmission. Here, the sampling frequency is 720 Hz, the rate of transmission is 64 kbps and, as described above, 64000/720=88.88 . . . Accordingly, there are formed odd bits, i.e., excess bits or insufficient bits no matter how the number of bits is determined per a frame. In this case, the receiving times t2 and t3 as measured based on the sampling timings do not assume constant values, and the samplings are not normally maintained in synchronism.

FIG. 4 illustrates an example of maintaining synchronism by inserting dummy bits according to the invention in contrast with the case of FIG. 3. In FIG. 4, a dummy bit is inserted in, for example, 8 frames among 9 frames between the fixed frames of transmission signals by using the dummy bit interpolator 105. Therefore, the number of bits to be sent by 9 frames is adjusted to be 800 bits (=(88+1)×8+(88+0)×1) to maintain transmission periods which are in synchronism of 720 frames a second.

It can thus be regarded that a multiple relationship exists between the sampling frequency and the rate of transmission. Therefore, even through there is no multiple relationship between the sampling frequency and the rate of transmission, the times for receiving the transmission signals as measured with the sampling timing as a reference can be maintained nearly constant making it possible to maintain the sampling timings in synchronism.

Embodiment 2

The embodiment 2 is the one in which the embodiment 1 is provided with means for accomplishing the synchronism at both ends with the fixed frame length of a transmission signal as a unit, and wherein the timings for inserting a dummy bit are synchronized between both terminals, and the times for receiving the transmission signals from the other terminals are maintained constant as measured from the sampling timing in order to maintain the sampling timings in synchronism.

Figure 5:
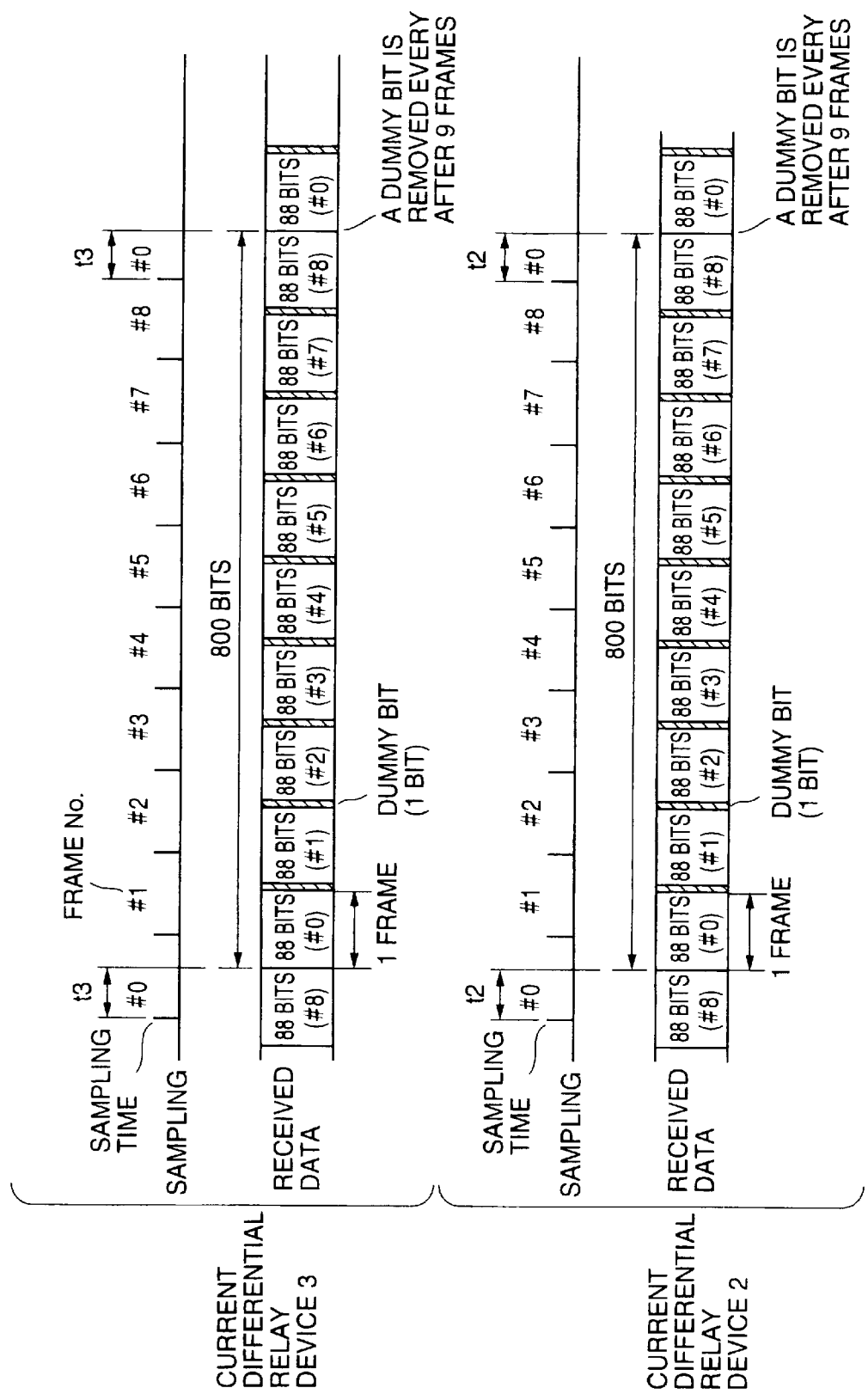

FIG. 5 illustrates an example of data transmitted according to this embodiment. In the example of FIG. 5, the sampling frequency is 720 Hz and the rate of transmission is 64 kbps. In this embodiment, the sampling synchronization control gives frame numbers (#0 to #7) to the sampling periods of the current differential relay devices 2 and 3 to accomplish the synchronism between the current differential relay devices 2 and 3 by using the frame numbers. By using the dummy bit interpolator 105, further, the dummy bits are inserted in 8 places among the frame numbers except a place between the frame number #8 and the frame number #0 of the fixed frame lengths of the transmission signals. The number of bits to be sent by the 9 frames is thus adjusted to 800 bits like in the case of the embodiment 1 to maintain a period of transmitting 720 frames a second.

Thus, the times for receiving the same frame number from the opposite ends as measured from the sampling timing are synchronized between the current differential relay devices 2 and 3 to accomplish the synchronism maintaining higher precision than that of the case of the embodiment 1.

Embodiment 3

In the embodiment 3, the dummy bits are inserted not maintaining an equal interval but maintaining a suitable interval to meet the timings for sending the signals at a predetermined period for synchronizing the samplings, in order to maintain the timings for receiving the frames on which the synchronization of samplings is based thereby to maintain the sampling timings in synchronism.

Figure 6:
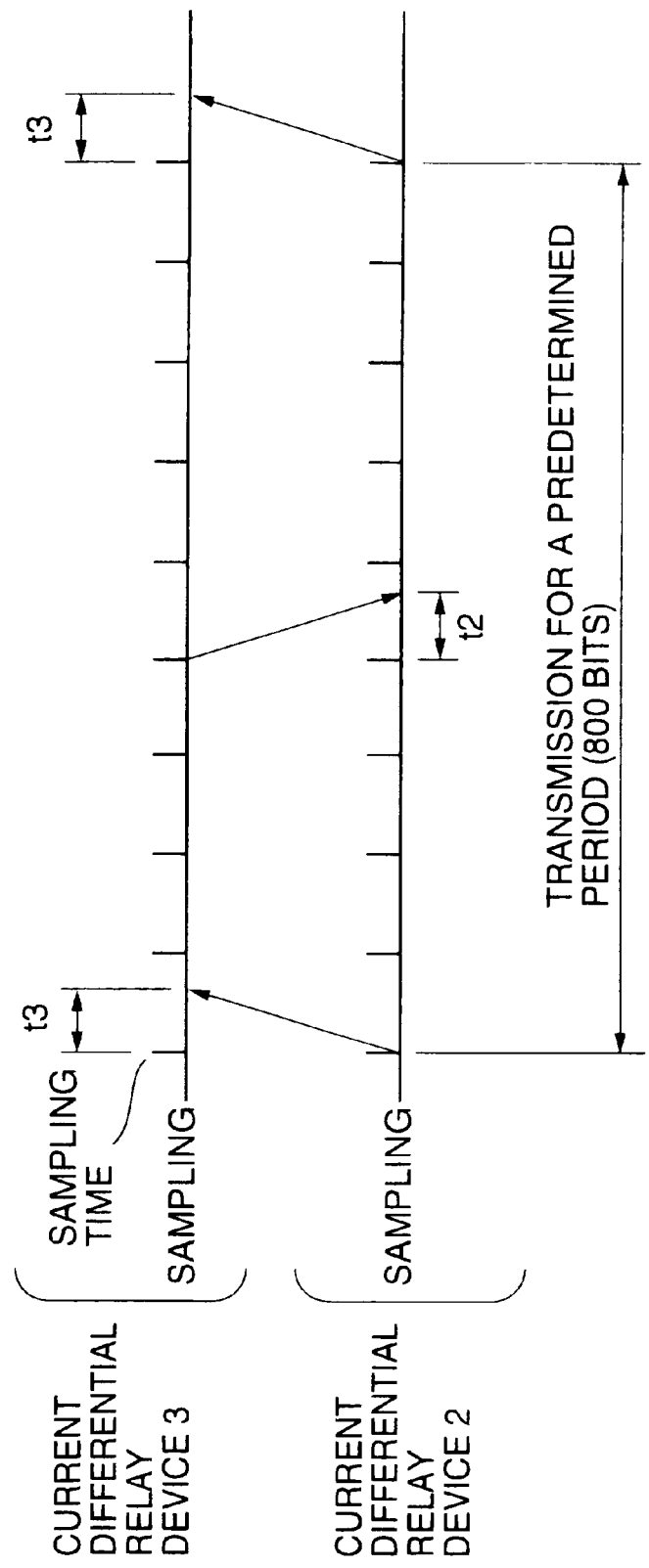

FIG. 6 illustrates the operation of the embodiment 3, i.e., illustrates an example in which the sampling frequency is 720 Hz and the rate of transmission is 64 kbps. In embodiment 3, a signal of a predetermined period is sent to measure the time data from the sampling timing for synchronizing the samplings. A dummy bit is suitably inserted to meet the timing of sending the signal in order to adjust the number of bits sent by 9 frames to be 800 bits (=89×9-1 bits) maintaining a transmission period of 720 frames a second. This makes it possible to nearly maintain the times for receiving the transmission signals from the other terminal as measured from the sampling timing and, hence, to maintain the sampling timings in synchronism between both terminals.

Embodiment 4

The embodiment 4 is the one in which the embodiment 1 is further provided with means for accomplishing the synchronism between both terminals with the fixed frame length of the transmission signal as a unit and means for picking up the clocks from the signals received from the other terminal, and wherein sampling synchronizing signals are output based on the clocks that are picked up to maintain the sampling timings in synchronism.

Figure 7:
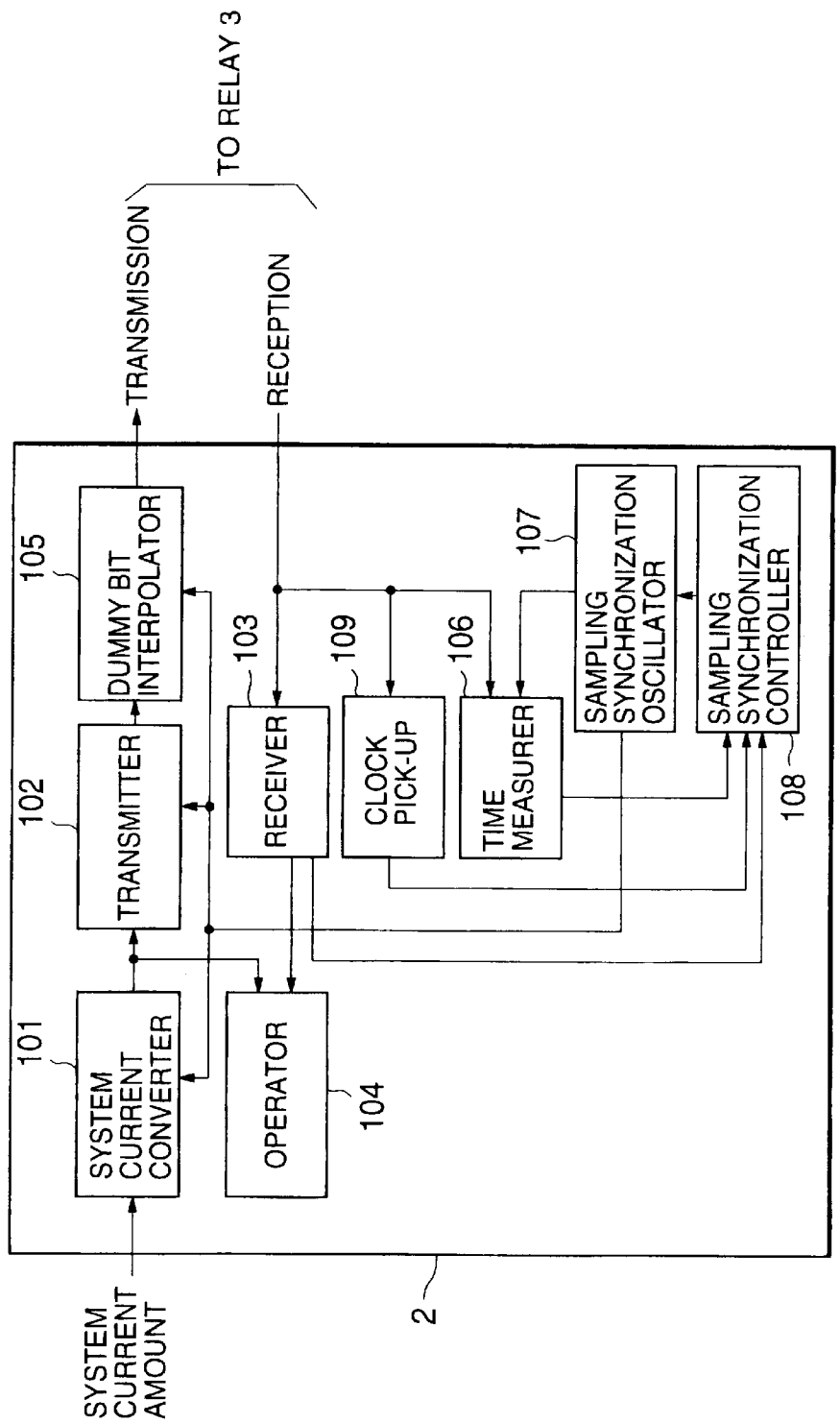
FIG. 7 is a block diagram illustrating the current differential relay device according to another embodiment of the present invention.
Figure 8:
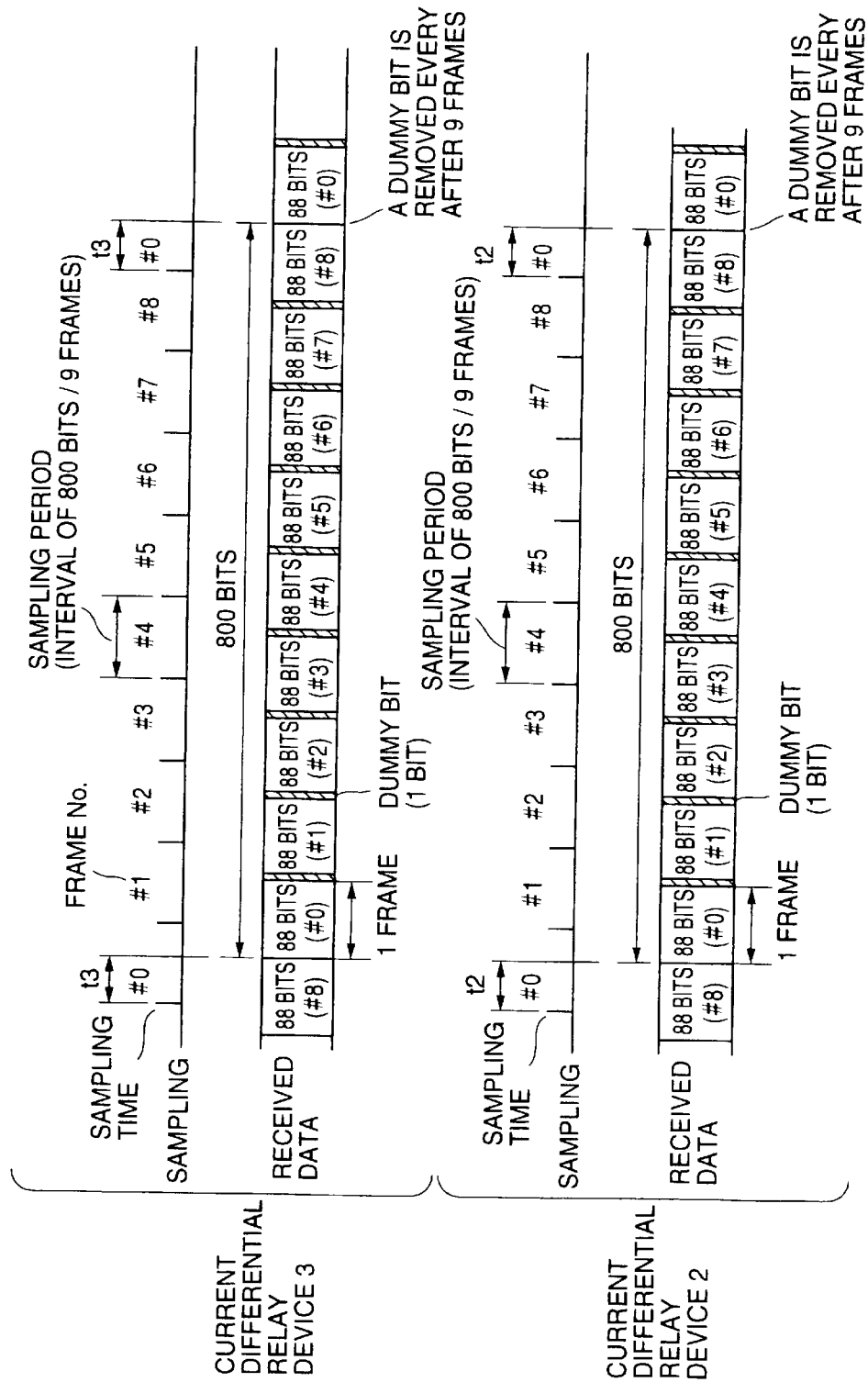
FIGS. 8 and 9 are diagrams illustrating different constitutions for transmitting data for explaining the operation of the device of FIG. 7.

FIG. 7 is a block diagram of the current differential relay device 2 according to the embodiment 4. FIG. 8 illustrates the operation of the embodiment 4, i.e., illustrates an example in which the sampling frequency is 720 Hz and the rate of transmission is 64 kbps. In the current differential relay device 2 of the embodiment 4, a clock pick-up 109 is added to the embodiment 1 to pick up clocks of data received from the other terminal 1B. Like in the embodiment 1, the synchronism is maintained between the two terminals relying on a fixed frame length. Here, however, the clocks are picked up from the received data, and the counted value of the number of clocks is equally divided by a number of the fixed frames to execute the sampling with a time interval that is equally divided. This makes it possible to maintain the sampling timings in synchronism between the two current differential relay devices 2 and 3.

Embodiment 5

The embodiment 5 is the one in which the embodiment 1 is further provided with means for accomplishing the synchronism between both terminals with the fixed frame length of the transmission signal as a unit, means for receiving clocks output from a communication unit and means for producing sampling synchronizing signals based on the received clocks, in order to maintain the sampling timings in synchronism.

Figure 9:
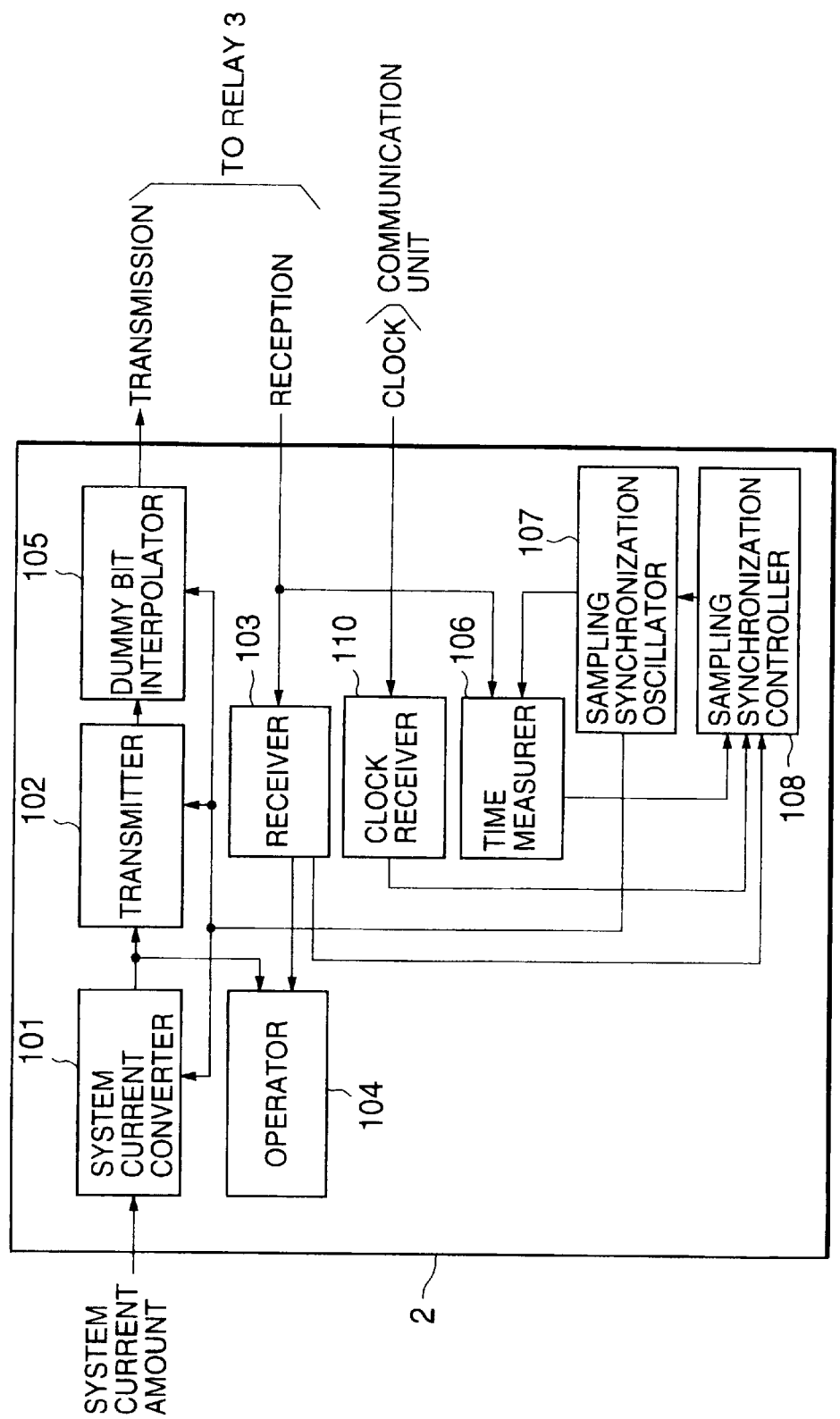

FIG. 9 is a block diagram of the current differential relay device 2 according to the embodiment 5. In the embodiment, the clock-receiver 110 is added to the embodiment of FIG. 1 to receive clocks in synchronism with the data obtained from the communication unit that is not shown and to control the sampling synchronization controller 108. Like in the embodiment 2, the synchronism is maintained between the two terminals relying on a fixed frame length. Here, however, the clocks in synchronism with the data obtained from the communication unit are received, the counted number of the clocks is equally divided by a number of the fixed frames to execute the sampling with a time interval that is equally divided. This makes it possible to maintain the sampling timings in synchronism between the two terminals.

Embodiment 6

The embodiment 6 is the one in which the embodiment 1 is equipped with means that produces dummy bits in a number of n or n ±1 to nearly maintain the timings for receiving the frames on which the synchronization of samplings is based to thereby maintain the sampling timings in synchronism.

The operation of the embodiment 6 will be described. Dummy bits are formed in a number of n or n ±1 for the embodiment 1. Here, the sampling frequency is 720 Hz and the ate of transmission is 64 kbps. For example, when the amount of data is only 80 bits, 9 dummy bits are inserted in each of the 8 frames among 9 frames, and a dummy bit is inserted in the remaining one frame, in order to adjust the number of bits sent by 9 frames to be 800 (=89×9-1) bits to maintain a transmission period of 720 frames a second like in the case of the embodiment 1. This makes it possible to nearly maintain the times for receiving signals from the opposing terminals as measured from the sampling times thereby to maintain the sampling timings in synchronism between both terminals.

What is claimed is:

1. A current differential relay device for sampling the currents at a first terminal and a second terminal of a power system at the same timing maintaining a predetermined period and for executing the operation for current differential protection by using a first current value sampled at the first terminal and a second current value sampled at the second terminal at the same timing and transmitted with a fixed frame unit that is set depending upon the sampling period, said current differential relay device comprising:

setting means for setting the number of digital transmission bits in said fixed frame to an integer which is not larger than a value of a rate of the bits/sampling frequency when there is no multiple relationship between the rate of transmitting the bits for transmitting the sampled currents in a digital form and the sampling frequency for sampling the currents; and dummy bit interpolation means for selectively inserting dummy bits among the fixed frames related to the digital transmission in order to maintain synchronism between timings of the sampling and the data transmission.

2. A current differential relay device according to claim 1, further comprising first synchronizing means for accomplishing synchronism between the first and second terminals with a predetermined number of fixed frames as a unit, and second synchronizing means for synchronizing the timings for inserting said dummy bit between both terminals.

3. A current differential relay device according to claim 1, wherein said dummy bit interpolation means inserts dummy bits at timings of sending the transmission data of a predetermined period in order to synchronize the samplings when there is no multiple relationship between the sampling frequency and the rate of transferring the bits.

4. A current differential relay device according to claim 1, further comprising synchronizing means for accomplishing the synchronism between the first and second terminals with the fixed frame length as a unit, clock pick-up means for picking up clocks from the transmission signals, and output means for producing sampling synchronizing signals based on the clocks that are picked up, in order to adjust the length of the transmission data by inserting dummy bits and to synchronize the samplings based on the clocks picked up from the received signals when there exists no multiple relationship between the sampling frequency and the rate of transmission.

5. A current differential relay device according to claim 1, further comprising synchronizing means for accomplishing the synchronism between the first and second terminals with the fixed frame length as a unit, and clock-receiving means for receiving clocks from an external communication unit and for producing sampling synchronizing signals based on the received clocks, in order to adjust the length of transmission data by inserting dummy bits and to synchronize the samplings based on the clocks output from the communication unit when there exists no multiple relationship between the sampling frequency and the rate of transmission.

6. A current differential relay device according to claim 1, further comprising means for forming dummy bits in a number of n or n±1, in order to adjust the length of transmission data by inserting the dummy bits to synchronize the samplings when there exists no multiple relationship between the sampling frequency and the rate of transmission.

* * * * *